(12) United States Patent
Friio

(10) Patent No.: US 12,482,003 B2
(45) Date of Patent: Nov. 25, 2025

(54) SYSTEMS AND METHODS RELATING TO MANAGING CUSTOMER WAIT TIMES IN CONTACT CENTERS

(71) Applicant: GENESYS CLOUD SERVICES, INC., Daly City, CA (US)

(72) Inventor: Andrea Friio, Daly City, CA (US)

(73) Assignee: Genesys Cloud Services, Inc., Daly City, CA (US)

( * ) Notice: Subject to any disclaimer, the term of this patent is extended or adjusted under 35 U.S.C. 154(b) by 0 days.

(21) Appl. No.: 17/551,844

(22) Filed: Dec. 15, 2021

(65) Prior Publication Data
US 2023/0186317 A1  Jun. 15, 2023

(51) Int. Cl.
*G06Q 30/016* (2023.01)
*G06Q 10/0631* (2023.01)

(52) U.S. Cl.
CPC ..... *G06Q 30/016* (2013.01); *G06Q 10/06313* (2013.01)

(58) Field of Classification Search
CPC .......... G06Q 30/016; G06Q 10/06313; G06Q 30/02; G06Q 30/06; G06Q 10/0639; G06Q 10/107; G06Q 50/12; G06Q 10/10; G06Q 20/102; G06Q 20/382; G06Q 30/01; G06Q 30/0201; G06Q 30/0277; G06Q 30/0601; G06Q 30/0609; G06Q 30/0635; G06Q 99/00; H04M 3/5238; H04M 2201/16; H04M 2203/2088; H04M 2203/551; H04M 3/42187; H04M 3/5232; H04M 3/5175; H04M 3/42221; H04M 3/51; H04M 3/5191; H04M 3/5237; H04M 15/00; H04M 2201/42; H04M 15/41; H04M 15/43; H04M 15/44; H04M 15/49; H04M 15/51; H04M 15/58; H04M 15/705; H04M 15/721; H04M 15/745; H04M 15/80; H04M 15/8044;
(Continued)

(56) References Cited

U.S. PATENT DOCUMENTS

2008/0175374 A1   7/2008  Lauridsen
2014/0016766 A1   1/2014  Strandberg
(Continued)

OTHER PUBLICATIONS

International Search Report and Written Opinion of co-pending PCT application having application No. PCT/US2022/052938 mailed on Apr. 6, 2023.

*Primary Examiner* — Avia Salman
(74) *Attorney, Agent, or Firm* — Taft Stettinuis & Hollister LLP

(57) ABSTRACT

A method for managing a queue in a contact center that includes: receiving a previous call from a first customer and determining a unique identifier; tracking a previous queue time; detecting the previous call ending without being connected to an agent; determining the previous wait time accrued; saving in a database a previous call record that includes the previous queue time and the unique identifier; receiving a present call from the first customer and determining a unique identifier; tracking a present queue time; using the unique identifier to check the database to determine the related previous call record; determining the previous queue time; calculating an adjusted total queue time that is the present queue time plus previous queue time; and positioning the first customer in the queue based on the adjusted total queue time.

14 Claims, 3 Drawing Sheets

(58) Field of Classification Search
CPC .. H04M 15/83; H04M 15/8351; H04M 15/84; H04M 2201/10; H04M 2201/36; H04M 2201/40; H04M 2201/54; H04M 2203/253; H04M 2203/355; H04M 2203/401; H04M 2207/203; H04M 2215/0104; H04M 2215/0108; H04M 2215/0152; H04M 2215/0164; H04M 2215/0168; H04M 2215/0176; H04M 2215/018; H04M 2215/0188; H04M 2215/42; H04M 2215/46; H04M 2215/54; H04M 2215/7009; H04M 2215/7045; H04M 2215/745; H04M 2215/81; H04M 2215/8108; H04M 2215/8129; H04M 2215/82; H04M 2242/22; H04M 3/2281; H04M 3/42059; H04M 3/48; H04M 3/487; H04M 3/5141; H04M 3/523; H04M 7/0024; H01B 3/20; H04L 41/06; H04L 41/5064; H04L 65/1069; H04L 12/1428; H04L 2101/65; H04L 41/024; H04L 41/0253; H04L 41/0803; H04L 41/0879; H04L 41/22; H04L 41/28; H04L 41/5029; H04L 41/5074; H04L 43/00; H04L 43/024; H04L 43/062; H04L 43/065; H04L 43/0811; H04L 43/0817; H04L 43/0852; H04L 43/10; H04L 43/106; H04L 47/122; H04L 47/26; H04L 51/00; H04L 61/5076; H04L 63/0218; H04L 63/0236; H04L 63/0281; H04L 63/0428; H04L 63/0442; H04L 63/0464; H04L 63/08; H04L 63/0807; H04L 63/0815; H04L 63/0823; H04L 63/083; H04L 63/1425; H04L 63/162; H04L 63/166; H04L 63/168; H04L 63/18; H04L 63/20; H04L 65/1063; H04L 65/80; H04L 67/02; H04L 67/025; H04L 67/1097; H04L 67/142; H04L 67/306; H04L 69/18; H04L 69/329; H04L 69/08; H04L 12/14; H04L 41/0213; H04L 41/0233; H04L 41/0681; H04L 41/08; H04L 41/142; H04L 41/18; H04L 41/5009; H04L 41/5022; H04L 41/5032; H04L 41/5061; H04L 41/5067; H04L 41/5083; H04L 41/5096; H04L 43/045; H04L 43/06; H04L 43/067; H04L 43/0805; H04L 43/0829; H04L 43/0847; H04L 43/0876; H04L 43/0888; H04L 43/0894; H04L 43/16; H04L 45/08; H04L 47/70; H04L 49/90; H04L 63/02; H04L 63/0209; H04L 63/0272; H04W 28/10; H04W 4/021; H04W 40/02; H04W 76/10; H04W 8/04; H04W 8/26; H04W 88/02; Y10S 379/90; Y10S 707/947; Y10S 707/99931; Y10S 707/99933; Y10S 707/99934; Y10S 707/99937; Y10S 707/99938; Y10S 707/99939; Y10S 707/99944; Y10S 715/969; H04Q 3/72; H01H 33/22; G06F 16/24568; G06F 16/9024; G06F 21/552; G06F 11/0709; G06F 11/0757; G06F 11/0769; G06F 11/0775; G06F 11/0781; G06F 11/0784; G06F 11/202; G06F 11/3003; G06F 11/32; G06F 11/324; G06F 11/327; G06F 11/328; G06F 11/3495; G06F 16/113; G06F 16/128; G06F 16/13; G06F 16/2237; G06F 16/2272; G06F 16/23; G06F 16/2365; G06F 16/24542; G06F 16/29; G06F 16/86; G06F 16/9032; G06F 16/90335; G06F 16/90344; G06F 21/00; G06F 21/41; G06F 2201/81; G06F 2201/86; G06F 2201/875; G06F 2221/2137; G06F 2221/2149; G06F 8/38; G06F 9/5077
USPC .......................................................... 705/304
See application file for complete search history.

(56) References Cited

U.S. PATENT DOCUMENTS

| | | | |
|---|---|---|---|
| 2022/0166884 A1* | 5/2022 | Bohannon | G06Q 10/06375 |
| 2022/0182493 A1* | 6/2022 | Ter | H04M 3/5238 |
| 2022/0360669 A1* | 11/2022 | Munoz | H04M 3/5233 |
| 2023/0036923 A1* | 2/2023 | Li | G10L 15/26 |
| 2023/0060694 A1* | 3/2023 | Cherukara | H04M 3/5238 |

* cited by examiner

SYSTEMS AND METHODS RELATING TO MANAGING CUSTOMER WAIT TIMES IN CONTACT CENTERS

BACKGROUND

The present invention generally relates to the field of customer relations management. More particularly, but not by way of limitation, the present invention relates to telecommunications systems in the field of customer relations management, including how customer wait times are managed by contact centers.

BRIEF DESCRIPTION OF THE INVENTION

The present invention includes a computer-implemented method for managing a queue in a contact center, wherein the queue includes customers on respective present calls with the contact center who are each waiting to be connected to an agent of the contact center, wherein the method, when described in relation to how an exemplary first customer of the customers is positioned within the queue relative to other ones of the customers, includes the steps of performing a first routine in relation to a previous call made by the first customer, where the previous call includes a call made previous to the present call by the first customer. The previous call includes the first customer being placed in the queue but ending before the first customer was connected to an agent. The first routine includes: receiving the previous call from the first customer and determining a unique identifier in relation to the previous call; tracking a previous queue time for the previous call, the previous queue time including wait time that the first customer accrues during the previous call waiting to be connected to the agent; detecting an end to the previous call occurring without the first customer being connected to an agent; determining the previous wait time accrued by the first customer given the detected end; saving in a database a previous call record related to the previous call, the previous call record includes the previous queue time associated with the unique identifier. The method further includes performing a second routine in relation to the present call of the first customer. The second routine includes: receiving the present call from the first customer and determining a unique identifier in relation to the present call; tracking a present queue time in relation to the present call, the present queue time including a wait time that the first customer accrues during the present call waiting to be connected to the agent; using the unique identifier of the present call to check the database to determine whether the previous call record stored therein has a unique identifier that matches the unique identifier of the present call; in response to confirming that the unique identifier of the present call matches the unique identifier of the previous call record, retrieving the previous call record and determining therefrom the associated previous queue time; calculating an adjusted total queue time for the first customer, wherein the adjusted total queue time includes the present queue time increased by at least some weighted component of the previous queue time for the first customer; and positioning the first customer in the queue based on a relative value of the calculated adjusted total queue time for the first customer versus the adjusted total queue times calculated for the other ones of the customers.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components. The drawings include the following figures.

DETAILED DESCRIPTION

Figure 1:
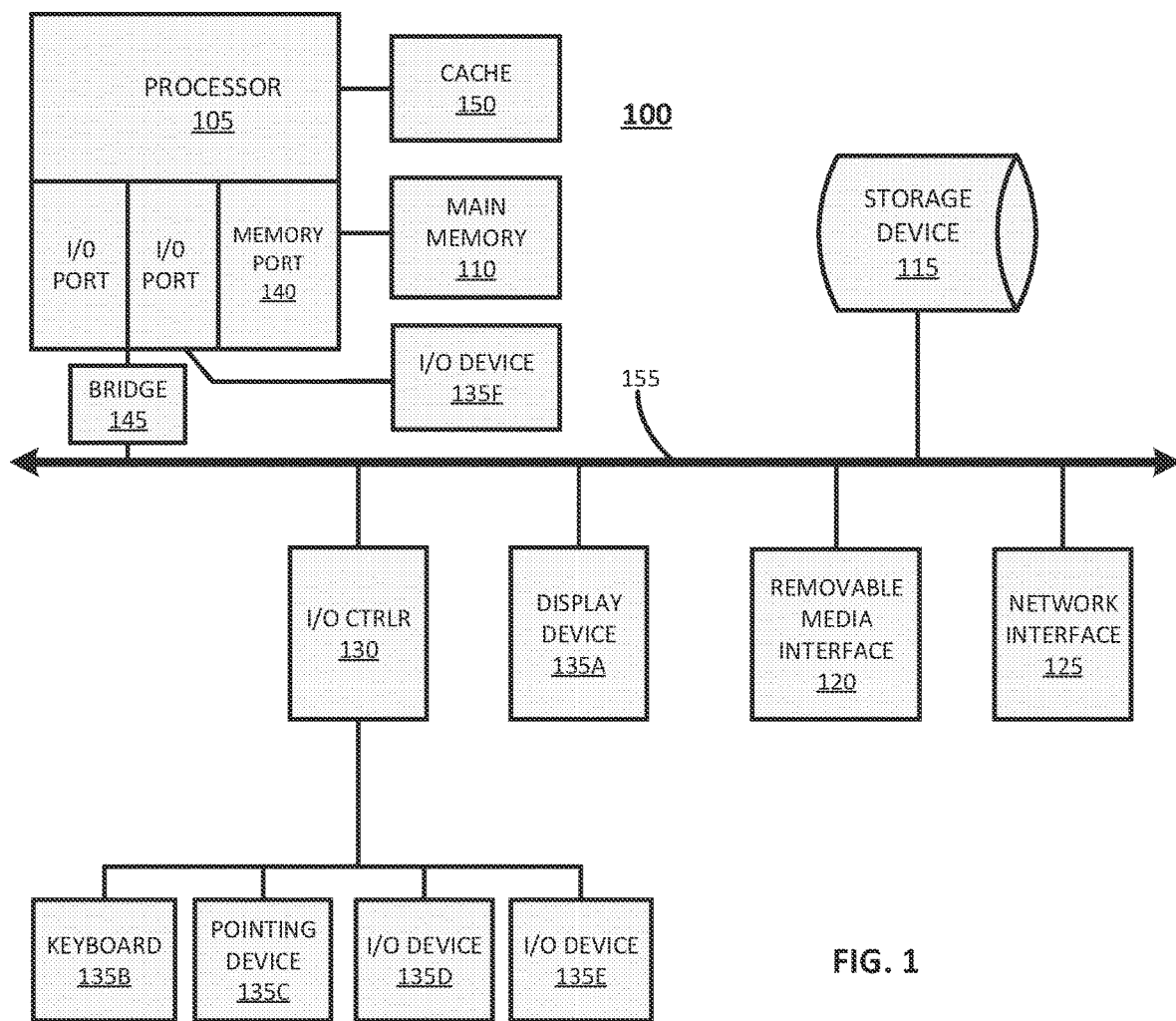
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Particular features, structures or characteristics may be combined in any suitable combinations and/or sub-combinations in one or more embodiments or examples. Those skilled in the art will recognize from the present disclosure that the various embodiments may be computer implemented using many different types of data processing equipment, with embodiments being implemented as an apparatus, method, or computer program product.

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Computing Device

The systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to any of the computing systems described herein, the various servers and computer devices may be located on computing devices 100 that are local (i.e., on-site) or remote (i.e., off-site or in a cloud computing environment), or some combination thereof.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be directly accessed by the central processing unit 105. The storage device 115 may provide storage for an operating system. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The computing device 100 may also support one or more removable media interfaces 120. More generally, the I/O devices 135 may include any conventional devices for performing the functionality described herein.

Unless otherwise restricted, the computing device 100 may be any workstation, desktop computer, laptop or notebook computer, server machine, virtualized machine, mobile or smart phone, portable telecommunication device, or any other type of computing device, without limitation, capable of performing the functionality described herein. The computing device 100 may include a plurality of devices and resources connected by a network. As used herein, a network includes one or more computing devices, machines, clients, client nodes, client machines, client computers, endpoints, or endpoint nodes in communication with one or more other such devices. The network may be a private or public switched telephone network (PSTN), wireless carrier network, local area network (LAN), private wide area network (WAN), public WAN such as the Internet, etc., with connections being established using communication protocols. More generally, it should be understood that, unless otherwise limited, the computing device 100 may communicate with other computing devices 100 via any type of network using any communication protocol. Further, the network may be a virtual network environment where various network components are virtualized. Other types of virtualization are also contemplated.

Contact Center

Figure 2:
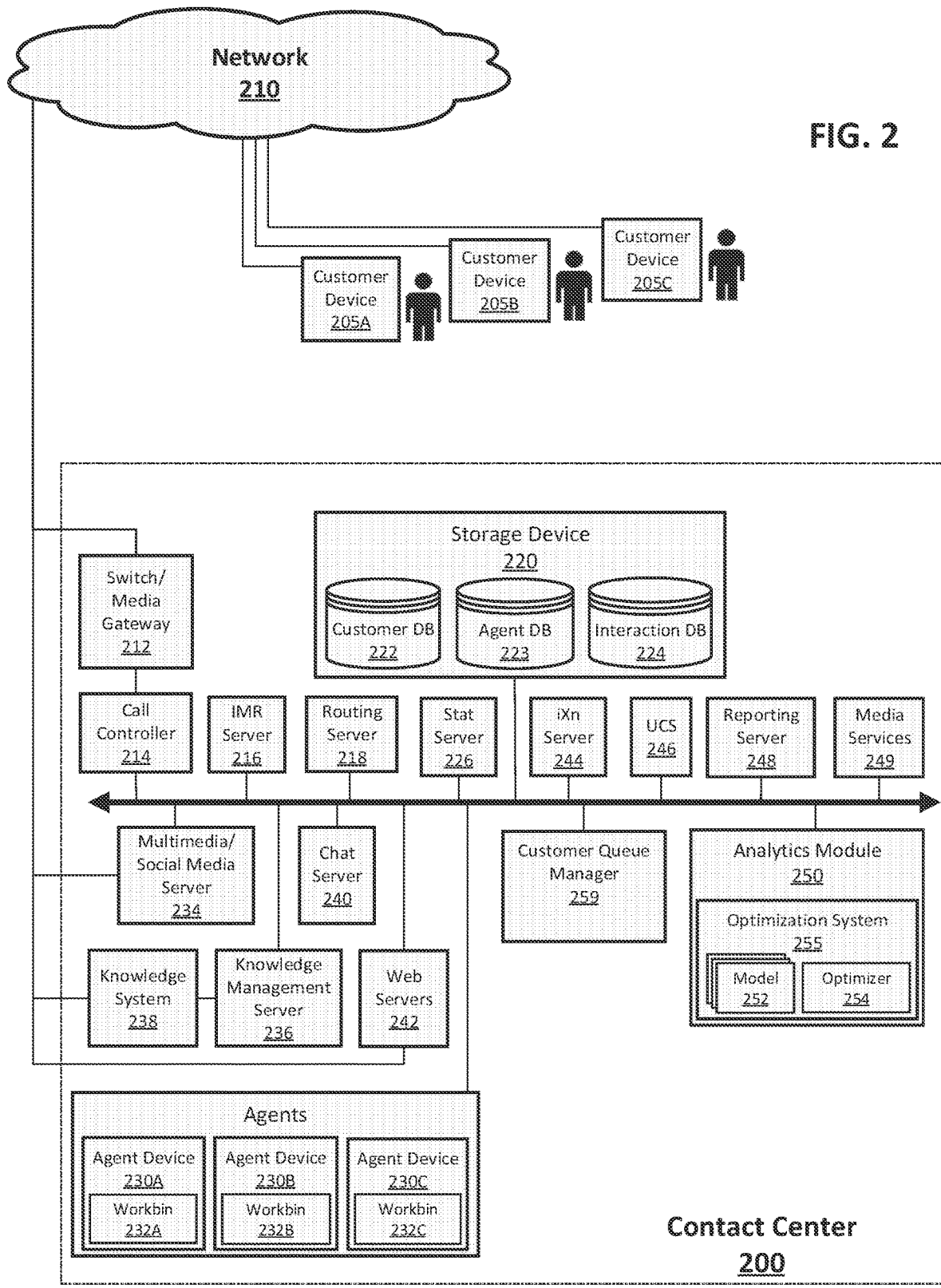
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), and/or the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may receive customer orders, solve customer problems with products or services already received, or assist customers in making purchasing decisions. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Referring specifically to FIG. 2, contact centers generally strive to provide quality services to customers while minimizing costs. Contact centers may include many different systems and modules—such as those shown in exemplary contact center system 200—in furtherance of this aim. The contact center system 200 may be used to engage and manage interactions in which automated processes (or bots) or human agents communicate with customers. As should be understood, the contact center system 200 may be an in-house facility to a business or enterprise for performing the functions of sales and customer service relative to its. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment. The contact center system 200 may include software applications or programs executed on premises and/or remotely. The various components of the contact center system 200, thus, may be distributed across various geographic locations and/or housed locally.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction server 244; universal contact server (or "UCS") 246; reporting server 248; media services server 249; an analytics module 250; and a customer queue manager module (or, simply, customer queue manager) 259. Any of the computer-implemented components, modules, or servers described in relation to FIG. 2 or in any of the following figures may be implemented via any type of computing devices, including the exemplary computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, and the like.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include any wireless carrier network.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230. As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VOIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the router or routing server 218, it may function to route incoming interactions. The routing server 218 may perform predictive routing whereby incoming interactions are routed to resources calculated to deliver the best result for the customer and/or contact center. For example, functionality within the routing server 218 may select the most appropriate agent and route the communication thereto. The agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent provides to the customer.

Regarding data storage, the contact center system 200 may include one or more mass storage devices—represented generally by the storage device 220—for storing data relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others, as functionality described herein would require.

The agent devices 230 of the contact center 200 may be communication devices configured to interact with the various components and modules of the contact center system 200 in ways that facilitate functionality described herein. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices 230, any number may be present.

In regard to the multimedia/social media server 234, it may be configured to facilitate media interactions (other than voice) with the customer devices 205 and/or the web servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server

240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

In regard to the customer queue manager 259, this component provides functionality related to managing customer wait times, particularly in regard to managing wait times in a queue that includes customers who were waiting to speak with an agent but had their call disconnected or dropped before they were connected. As discussed in more detail below, the customer queue manager 259 does this situation via orchestrating other components, servers, and modules of a contact center, such as those described above in relation to the example contact center system 200, so to provide the queue managing functionality described herein, as would be understood by one of ordinary skill in the art.

The various components, modules, and/or servers of FIG. 2—as well as those of other figures included herein—may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, it should be recognized that the functionality of various servers may be combined or integrated into a single server, or the functionality of a particular server may be distributed across one or more other servers. Further, the terms "interaction" and "communication" are used interchangeably, and generally refer to any real-time and non-real-time interaction that uses any communication channel of the contact center. Access to and control of the components of the contact system 200 may be affected through user interfaces (UIs) which may be generated on the customer devices 205 and/or the agent devices 230.

Figure 3:
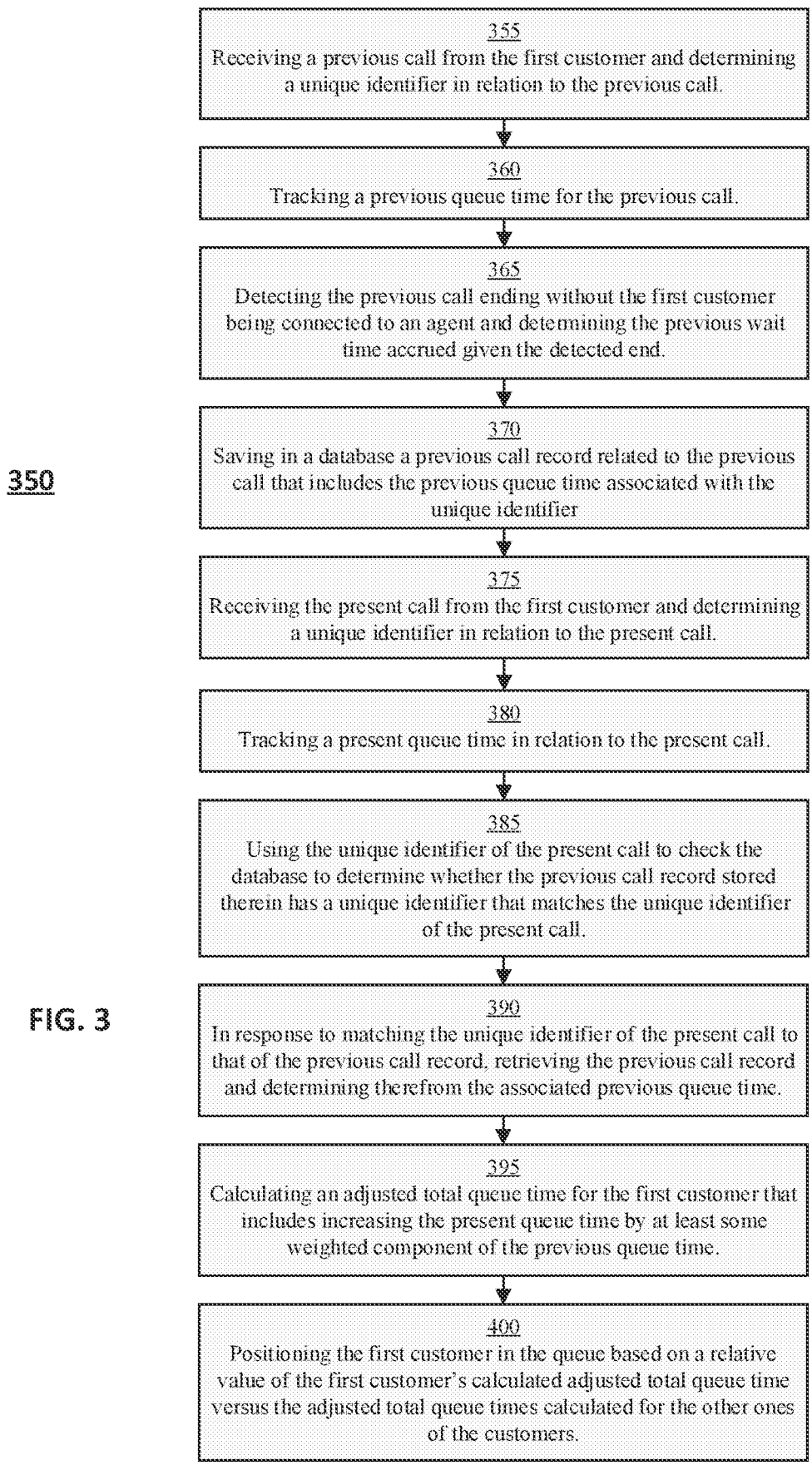
FIG. 3 is an automated process for managing customer wait times.

Turning now to FIGS. 3, the functionality of the customer queue manager 259 of the present invention will now be presented in accordance with example embodiments. Before proceeding with this, though, some background as to how contact centers function will be provided while also highlighting some example operational shortcomings that the present invention is intended to address.

In general, contact centers purposefully do not schedule enough working agents in a shift so that an agent is available to take each incoming customer call the moment it arrives. With this being the case, when a customer calls a contact center, the customer is typically placed into a "virtual queue"—which is also be referred to herein simply as a "queue"—where the customer waits to speak to an agent when one becomes available. The queue is typically managed, at least in part, on the principle of first-come/first-served so that the customer that has been waiting the longest is generally next in line for being connected to an agent. However, if one of these calls gets disconnected, dropped, or ends for some reason, the customer has to call back and start the process over. That is, when the customer calls back, the customer is treated like they are calling anew. The customer is placed at the end of the queue, and the customer's wait begins all over again. This result can be incredibly frustrating for the customer. Further, the outcome is unfair because, between the two calls, the customer will end up waiting longer than other customer who are connected to an agent before them.

The present application provides systems and methods that address these issues in queue management. According example embodiments, the customer queue manager 259 of the present invention bases the customer's position in the queue on a first-come/first-served criteria that is not so easily derailed by a disconnection. That is, the customer's position in the virtual queue is not limited to the customer's on-going or present call but also takes into account the wait time the customer experienced during a previous call that was disconnected or otherwise ended. Thus, as will be seen, the customer queue manager 259 includes functionality that totals the wait time accumulated on multiple connections or calls. In this way, as will be seen, a customer can receive credit for time spent waiting on one or more previous calls that were dropped or disconnected when being placed in the queue.

When discussing examples as to how exemplary embodiments of the present invention function, several concepts will be referenced with some regularity so that it may be helpful to clarify the terminology for these concepts before proceeding. First, as used herein, a "call" is meant to broadly refer to any interaction over a communication channel wherein speech is exchanged in real-time. Thus, a "call", unless otherwise narrowed, may refer to a conventional telephone call, data network audio streaming, and/or video conferencing. Second, in describing the invention, it will be appreciated that two different calls will need to be referenced and distinguished from each other. That is, a distinguishing reference will need to be made between one type of call to the contact center that ends in a disconnection and another type of call made subsequent to that disconnection that involves the customer is trying to reconnect with the contact center. Accordingly, as used herein, the initial call that ends, for example, with a disconnection, will be referred to as a "previous disconnected call" or, simply, a "previous call". And the call made subsequent to the previous call will be referred to as a "present call". In relation to these call types, the following terms will be used to differentiate between the time spent or accrued waiting (or "queue time") during each. In regard to the "previous call", the time spent during that call waiting in queue for an agent will be referred to as a "previous queue time". And, in regard to the "present call", the time spent during that call waiting in queue for an agent will be referred to as a "present queue time".

It will be appreciated that a contact center may have more than one queue. That is, a contact center may have a general queue in which customers wait for a variety of services or more specific queues, for example, queues for billing, customer service, sales, in which customers wait along with like customers for a particular service. The customer queue manager 259 of the present invention may be applied selectively to some of the queues in a contact center or more generally to each of the queues, as may be needed or desired. As will be understood, the present invention may be applied so that the wait times of like customers (i.e., the customers waiting in the same queue) are treated the same in regard to how their wait times are calculated for determining the order to the queue.

In regard to example embodiments of the customer queue manager 259, an initial step includes tracking each customer's wait time or time in a queue, i.e., "queue time" on each call. As used herein, "queue time" refers to the accumulated or accrued time during a particular call that the customer has waited, for example, waiting on hold to be connected to an agent. In addition, the customer queue manager 259 may determine a unique identifier for each of the calls. The unique identifier may be an identifier relating to the identity of the customer. For example, the unique identifier may be the phone number associated with the phone used by the customer to make the call. Then, when a call is dropped or disconnected before being connected to an agent, the customer queue manager 259 may recorded in a database a call record that includes the accumulated queue time that had been tracked for the call. Additionally, the customer queue manager 259 associates the accumulated queue time with the unique identifier. Per the terminology introduced above, it will be appreciated that, in this example, the disconnected call is the "previous call" and the queue time recorded in relation to it is the "previous queue time". Then, when that same customer calls the contact center again to reestablish a connection and again wait to be connected to an agent—which is the customer's "present call"—the customer queue manager 259 may identify the customer by the unique identifier and once identified, the customer's previous call and previous queue time are retrieved from the database. The customer's position within the queue can then be determined by the customer queue manager 259 based on the both the customer's previous queue time and present queue time, which may be referred to as an adjusted total queue time. Once this position is determined, the customer queue manager 259 inserts the customer in the queue at the appropriate positioned, and the customer waits to be connected to an agent.

More specifically, according to exemplary embodiments, the queue and the calculation of each customer's position within the queue is managed by the customer queue manager 259 according to the following principles. First, a customer's position within the queue is based on the customer's adjusted total queue time. As used herein, the adjusted total queue time is calculated as a sum (or a weighed sum) of the queue time accruing for a customer in a present call and the queue time for the customer accrued in a previous call. In accordance with some embodiments, a plurality of previous calls that were disconnected may be considered. In such cases, the total queue time is calculated as a sum of the queue time for a customer in a present call and the queue times for the customer accrued in two or more respective previous calls.

For example, if Customer Sally has a previous call in which she waited 7 minutes before being disconnected and, after calling back, has been waiting 5 minutes on a present call, Customer Sally has an adjusted total queue time of 12 minutes. However, if Customer Bob has never been disconnected and has been waiting 10 minutes on his present call, his adjusted total queue time is simply the same as his queue time in the present call, i.e., 10 minutes. Second, the queue is sorted in a descending order based on the relative values of an adjusted total queue time criterium (i.e., the adjusted total queue times for the customers in the queue) such that a customer having a higher adjusted total queue time is positioned ahead of a customer having a lower adjusted total queue time, which means that the customer having the higher adjusted total queue time will be connected to an agent before than the one having the lower adjusted total queue time. Thus, to continue the example, Sally, with an adjusted total queue time of 12 minutes, would be positioned ahead of Bob in the queue because his adjusted total queue time is 10 minutes.

In operation, the customer queue manager 259 may function as follows. A customer who had a previous call dropped or disconnected will have the previous queue time associated with this previous call recorded and stored in a database. As part of this storage in the database, the previous queue time is associated with a unique identifier determined from the previous call so that it can later be identified as being associated with a particular customer. Thus, for every incoming call into the contact center system, the system may routinely check for a unique identifier associated with the incoming call and, if one can be determined, check to see whether any previous calls and/or previous queue times are associated with the unique identifier. If it is determined that the unique identifier is associated with a previous call and/or previous queue time, then the adjusted total queue time for the customer is calculated for the customer as, for example, being the sum of the present queue time (i.e., the time in queue associated with the present call) and the previous queue time. If it is determined that there is not a previous call associated with the unique identifier, then the adjusted total queue time for the customer is calculated as being whatever queue time has accrued during the present call. The queue is then sorted in descending order in accordance with each customer's adjusted total queue time so that those customers having the greatest adjusted total queue time are connected to agents first. As will now be presented, the present invention also includes several alternative embodiments employing particular features for enhancing certain aspects of how the customer queue manage 259 operates.

In accordance with alternative embodiments, a maximum allowable time lag between two calls (i.e., between the previous call and the present call) may be employed. In such cases, the customer will not receive the benefit of their previous queue time if too much time has passed before the present calls is made. For example, a maximum allowable time lag between calls may be set at an hour so that if the customer does not call back within an hour of the when the previous call ended, the customer will not have the queue time associated with the previous call added to their present queue time when calculating their adjusted total queue time. This type of functionality may be described as disqualifying the call made previously by the customer because too much time has passed.

In accordance with alternative embodiments, the reason as why the call was dropped or disconnected may be deemed immaterial with regard to whether the customer receives the benefit of the previous queue time associated with their previous call. That is, the customer will receive the benefit of the previous queue time whether the call was disconnected by the customer voluntarily or deliberately or dropped for reasons outside of the customer's control.

In accordance with alternative embodiments, a customer that has to call back into the contact center because of a dropped or disconnected call may also have a "queue time disconnection bonus" added to their adjusted total queue time. In one embodiment, the queue time disconnection bonus may be set according to an estimate as to the time it took the customer to reconnected to the contact center and/or navigate the contract center's systems to arrive back in their original queue. In this way, the customer not only receives credit for the previous queue time but, with the queue time disconnection bonus, also for the amount of time that it likely takes the customer to reconnect with the contact center and regain their position in a desired queue. In this way, the customer is more accurately put back into the position they would have had but for their call being disconnected. The queue time disconnection bonus also may be set to compensate the customer for the added frustration of having to reconnect with the contact center. In this case, the queue time disconnection bonus recognizes that being disconnected can be highly frustrating and, in the interest of allaying this frustration and delivering a better customer experience, bumping the customer further up the queue may be an effective strategy for the contact center.

In accordance with alternative embodiments, customers may be notified that they will receive or are receiving the benefit of their previous queue time. This type of communication may be supplied, for example, by a recorded message. In one such embodiment, the customer receives this message as part of their original or previous call. Providing this communication at this time may encourage the customer to call back the contact center after a disconnection because the customer knows they will not be starting over at the back of the queue. In another embodiment, the customer may receive this notification when they call back after a disconnection. In such cases, the customer may be told, for example, that they are being positioned in the queue with their previous queue time being added to their present queue time. As will be appreciated, such information will be well received by the customer, as it indicates a concern for their time and fair outcomes. When applicable, such a notification also may communicate to the customer that they are receiving a queue time disconnection bonus.

In accordance with alternative embodiments, the above-described concepts can be extended to a chat system of a contact center, for example, when the customer is known by a unique identifier (email/account number).

In accordance with alternative embodiments, the above-described concepts are extended to instances when the customer was connected to an agent, but the call was subsequently disconnected or lost for some reason. When the customer calls back, the previous queue time the customer waited to be connected to the agent may be used to calculate an adjusted total queue time for the purposes of placing the customer in a current queue. In certain embodiments, besides the initial time spend in queue, other non-productive time experienced by the customer during the previous call may be added to the customer's wait time for determining the customer's adjusted total queue time. Such non-productive time may include the customer being placed on hold or the time spent with a first agent where a transfer to a second agent was necessary because the first agent was not qualified or unable to help with the customer's problem. Further, in cases where the previous call with an agent was not disconnected or lost, but it is known or likely believed that the present call by the customer is regarding the same issue as the previous call because a resolution was not achieved during the previous call, the customer may receive the benefit of their previous queue time and/or the length of the non-productive call (either in part or in whole) when calculating the adjusted total queue time for placing the customer in queue for the present call. In such instances, this recognizes that the previous call, including the previous queue time and the call itself, amounted to the customer time being spend while their problem was not properly resolved.

In accordance with certain embodiments, as stated, the unique identifier is the cell phone number of the customer. According to other embodiments, such as when the call is being made via streaming voice over network, the unique identifier may be an IP address or an identifier associated a cookie downloaded to the customer's device. In other embodiments, the unique identifier may be a customer number or other identifier given by the customer at the beginning of the call. In other embodiments, the unique identifier is provided by the contact center to the customer during the previous call. In this case, the unique identifier is then provided back to the contact center by the customer at the beginning of the present call. One or more steps of these processes may be performed via automated processes, as one of ordinary skill in the art would appreciate.

With specific reference now to FIG. 3, a method 350 is provided for managing a queue in a contact center, such as may be performed by the customer queue manage 259. As will be seen, the method 350 is described in relation to two different types of calls, which are introduced above as "previous calls" and "present calls". With this being the case, the method 350 may be described in reference to a first routine, which is performed in relation to the so-called "previous calls" and a second routine that is performed in relation to the so-called "present calls". It should be understood, though, that the "previous call" and "present call" are, of course, designations that are made in relation to each other and make sense when appreciated in this manner. That is, these names are given with the knowledge that a particular call (i.e., the previous call) becomes disconnected or otherwise ends before the customer is able to speak with an agent and that this disconnection results in the customer having to make another call (i.e., the present call) to reestablish a connection with the contact center. Accordingly, the first routine refers to a process for handling all such "previous calls" (i.e., those calls that happen to end before connecting with an agent). The first routine is represented by steps 355 through 370 in the method 350 below. And, the second routine refers to a process for handling all such "present calls" so that any related "previous calls" are found in the database, which then allow the associated previous queue time to be used in calculating the adjusted total queue wait time for a particular customer. The second routine is represented by steps 375 through 400 in the method 350 below. Finally, the method 350 will be described in relation to how an exemplary "first customer" is positioned within the queue relative to other ones of the customers, though it will be appreciated that the "first customer" is representative of how any customer in the queue is treated that had a previous call end in a disconnection.

The first routine of the method 350 includes the following steps related to the first customer's previous call. At step 355, the method 350 includes the step of receiving the previous call from the first customer and determining a unique identifier in relation to the previous call. At step 360, the method 350 includes tracking a previous queue time for the previous call, where the previous queue time including wait time that the first customer accrues during the previous call waiting to be connected to the agent. At step 365, the method 350 includes detecting the previous call ending without the first customer being connected to an agent and determining the previous wait time accrued by the first customer given when the previous call ended. At step 370, the method 350 includes saving in a database a previous call record related to the previous call, wherein the previous call record includes the previous queue time associated with the unique identifier.

The second routine of the method 350 includes the following steps related to the customer's present call and how that call is positioned in the queue. At step 375, the method 350 includes receiving the present call from the first customer and determining a unique identifier in relation to the present call. At step 380, the method 350 includes tracking a present queue time in relation to the present call, the present queue time including a wait time that the first customer accrues during the present call waiting to be connected to the agent. At step 385, the method 350 includes using the unique identifier of the present call to check the database to determine whether the previous call record stored therein has a unique identifier that matches the unique identifier of the present call. At step 390, the method 350 includes, in response to confirming that the unique identifier of the present call matches the unique identifier of the previous call record, retrieving the previous call record and determining therefrom the associated previous queue time. At step 395, the method 350 includes calculating an adjusted total queue time for the first customer, where the adjusted total queue time includes the present queue time increased by least some weighted component of the previous queue time for the first customer. And, at step 400, the method 350 includes positioning the first customer in the queue based on a relative value of the calculated adjusted total queue time for the first customer versus the adjusted total queue times calculated for the other ones of the customers. Several alternative embodiments, including proposed specific functionality related to certain elements introduced above, will now be discussed.

In accordance with certain embodiments, the positioning of the first customer in the queue further includes ordering the customers in the queue in a descending order based on the adjusted total queue time for each. In accordance with certain embodiments, the adjusted total queue time is calculated as a sum of the present queue time and the previous queue time.

In accordance with certain embodiments, the unique identifier for both the previous call and the present call is a phone number of the phone used to make each call. Both the previous call and present call of the first customer may be a telephone call made by a first phone of the first customer. The first phone may have a first phone number. In such cases, the step of determining the unique identifier for the previous call of the first customer may include the contact center determining, via a first automated process as the previous call arrives at the contact center, the first phone number of the first phone. And, the step of determining the unique identifier for the present call of the first customer may include the contact center determining, via the first automated process as the present call arrives at the contact center, the first phone number of the first phone.

In accordance with certain embodiments, the previous call and the present call each may include a voice interaction conducted via data network audio streaming initiated by a user device of the first customer. In such cases, the step of determining the unique identifier for the previous call of the first customer may include a second automated process based on data exchanged during the previous call between the user device of the customer and the contact center. And, the step of determining the unique identifier for the present call of the first customer may include the second automated process based on data exchanged during the present call between the user device of the customer and the contact center. The second automated process, for example, may include a browser cookie and Internet Protocol (IP) address tracking.

In accordance with certain embodiments, the step of determining the unique identifier related to the previous call may include: prompting the first customer to provide a customer number, where the customer number relates to an identify of the first customer known by the contact center; receiving, as input from the first customer, the customer number; and determining that the received customer number is the unique identifier of the previous call. And, the step of determining the unique identifier related to the present call may include: prompting the first customer to provide the customer number; receiving, as input from the first customer, the customer number; and determining that the received customer number is the unique identifier of the present call.

In accordance with certain embodiments, the step of determining the unique identifier related to the previous call may include: communicating an interaction number to the first customer during the previous call; and determining that the interaction number is the unique identifier of the previous call. The interaction number may be a randomly generated unique number that is used to identify an association with the previous call interaction. In such cases, the step of determining the unique identifier related to the present interaction may include: prompting the customer to provide the interaction number during the present call; receiving from the customer the interaction number; and determining that the received interaction number is the unique identifier of the present call.

In accordance with certain embodiments, the method may include a maximum allowable time lag between calls. In such cases, the method may further include the steps of: measuring a time lag that occurs between the previous call and the present call; determining whether the measured time lag is less than a maximum allowable time lag; and conditioning how the adjusted total queue time is calculated on whether the measured time lag is less than a maximum allowable time lag. Thus, if the measured time lag is less than the maximum allowable time lag, the calculation of the adjusted total queue time includes the present queue time increased by the least some weighted component of the previous queue time. Alternatively, if the measured time lag is greater than the maximum allowable time lag, the calculation of the adjusted total queue time is limited to only the present queue time (i.e., the previous queue time is not added to it).

In accordance with certain embodiments, the adjusted total queue time may also include a queue time disconnection bonus. In such cases, the calculation of the adjusted total queue time for the first customer includes the sum of: the present queue time; the previous queue time; and the queue time disconnection bonus. The queue time disconnection bonus may include an estimation of a time required for the first customer to reconnect with the contact center and reestablishing a position within the queue.

In accordance with certain embodiments, the method may further include the step of notifying the first customer during the previous call that, if the previous call of the first customer ends before being connected to an agent and the first customer call the contact center back, the first customer will be credited the previous queue time when being positioned back in the queue. In accordance with certain embodiments, the method may further including the step of notifying the first customer during the present call that the first customer is receiving credit for the previous queue time accrued during the previous call when being positioned back in the queue.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims.

Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for routing voice interactions from a queue in a contact center system, wherein the queue comprises a virtual queue of present voice interactions initiated by respective customers with the contact center system who are each waiting to be connected to an agent of the contact center system, wherein the method, when described in relation to how an exemplary first customer of the customers is positioned within the queue relative to other ones of the customers, comprises the steps of:

performing, by the contact center system, a first routine in relation to a previous voice interaction made by the first customer, wherein the previous voice interaction is made previous to the present voice interaction by the first customer, the previous voice interaction comprising the first customer being placed in the queue but ending before the first customer was connected to an agent as a result of a disconnection of the previous voice interaction between the first customer and the contact center system, the first routine comprising:

receiving the previous voice interaction from the first customer utilizing a customer device via a network connected to a switch/media gateway of the contact center system, wherein the switch/media gateway comprises at least one of an automatic call distributor, a private branch exchange (PBX), or an IP-based software switch and that functions as a central switch for agent level routing within the contact center system;

determining, via an automated process, a unique identifier in relation to the previous voice interaction, including extracting, with a call controller that includes computer-telephone integration software for interfacing with the switch/media gateway and that is connected to the switch/media gateway of the contact center system, that includes a session initiation protocol server for processing session initiation protocol communications, and that operates as an adapter between the switch/media gateway and a routing component of the contact center, data regarding the previous voice interaction;

tracking a previous queue time for the previous voice interaction, the previous queue time comprising a wait time that the first customer accrues during the previous voice interaction waiting to be connected to the agent by the switch/media gateway;

detecting an end to the previous voice interaction occurring without the first customer being connected to an agent as a result of the disconnection of the previous voice interaction between the first customer and the contact center system;

determining the previous queue time accrued by the first customer given the detected end;

saving in a database a previous voice interaction record related to the previous voice interaction, wherein the previous voice interaction record includes the previous queue time associated with the unique identifier;

performing, by the contact center system, a second routine in relation to the present voice interaction of the first customer, the second routine comprising:

receiving the present voice interaction from the first customer utilizing the customer device via the network connected to the switch/media gateway of the contact center system;

determining, via the automated process, a unique identifier in relation to the present voice interaction, including extracting, with the call controller connected to the switch/media gateway, data regarding the present voice interaction;

tracking a present queue time in relation to the present voice interaction, the present queue time comprising a wait time that the first customer accrues during the present voice interaction waiting to be connected to the agent by the switch/media gateway;

using the unique identifier of the present voice interaction to check the database to determine whether the previous voice interaction record stored therein has a unique identifier that matches the unique identifier of the present voice interaction and is therefore indicative of a prospective reconnection attempt between the first customer and the contact center system;

in response to confirming that the unique identifier of the present voice interaction matches the unique identifier of the previous voice interaction record, retrieving the previous voice interaction record and determining therefrom the associated previous queue time;

measuring a time lag that occurs between the previous voice interaction and the present voice interaction and determining whether the measured time lag is less than a maximum allowable time lag;

conditionally calculating an adjusted total queue time for the first customer based on whether the measured time lag is less than a maximum allowable time lag such that: if the measured time lag is less than the maximum allowable time lag, the present voice interaction is determined to be indicative of a reconnection attempt between the first customer and the contact center system and the adjusted total queue time is calculated as a sum of the present queue time and the previous queue time; and if the measured time lag is greater than the maximum allowable time lag, the adjusted total queue time is calculated as being equal to the present queue time;

positioning the first customer in the queue based on a descending order of a relative value of the calculated adjusted total queue time for the first customer versus the adjusted total queue times calculated for the other ones of the customers; and routing the present voice interaction of first customer to a user device of an agent of the contact center system using the switch/media gateway of the contact center system, wherein the routing is ordered relative to routings of voice interactions of the other ones of the customers in accordance with the positioning of the first customer in the queue.

2. The method of claim 1, wherein ordering the routings in accordance with the positioning of the first customer in the queue comprises completing the routing of the voice interaction of the first customer:

after each of the other ones of the customers positioned ahead of the first customer in the queue are connected to an agent; and before each of the other ones of the customers positioned behind of the first customer in the queue are connected to an agent.

3. The method of claim 2, wherein the unique identifier for both the previous voice interaction and the present voice interaction comprises a phone number of a phone used to make each voice interaction.

4. The method of claim 3, wherein both of the previous voice interaction and present voice interaction of the first customer are a telephone call made by a first phone of the first customer, the first phone having a first phone number; wherein:

the step of determining the unique identifier for the previous voice interaction of the first customer comprises the contact center system determining, via the automated process as the previous voice interaction arrives at the contact center system, the first phone number of the first phone; and the step of determining the unique identifier for the present voice interaction of the first customer comprises the contact center system determining, via the automated process as the present voice interaction arrives at the contact center system, the first phone number of the first phone.

5. The method of claim 2, wherein the previous voice interaction and the present voice interaction each comprises a voice interaction conducted via data network audio streaming initiated by the customer device of the first customer; and wherein:

the step of determining the unique identifier for the previous voice interaction of the first customer comprises the automated process based on data exchanged during the previous voice interaction between the customer device of the customer and the contact center system; and the step of determining the unique identifier for the present voice interaction of the first customer comprises the automated process based on data exchanged during the present voice interaction between the customer device of the customer and the contact center system.

6. The method of claim 5, wherein the automated process includes at least one of a browser cookie and Internet Protocol (IP) address tracking.

7. The method of claim 2, wherein the adjusted total queue time comprises a queue time disconnection bonus such that calculation of the adjusted total queue time for the first customer comprises the sum of:

the present queue time;
the previous queue time; and
the queue time disconnection bonus;
wherein the queue time disconnection bonus comprises an estimation of a time required for the first customer to reconnect with the contact center system and reestablishing a position within the queue.

8. The method of claim 2, further comprising the step of notifying the first customer during the previous voice interaction that, if the previous voice interaction of the first customer ends before being connected to an agent and the first customer initiates another voice interaction with the contact center system, the first customer will be credited the previous queue time when being positioned back in the queue.

9. The method of claim 2, further comprising the step of notifying the first customer during the present voice interaction that the first customer is receiving credit for the previous queue time accrued during the previous voice interaction when being positioned back in the queue.

10. A contact center system for routing voice interactions from a queue in the contact center system, wherein the queue comprises a virtual queue of present voice interactions initiated by respective customers with the contact center system who are each waiting to be connected to an agent of the contact center, the system comprising:
 a switch/media gateway comprising at least one of an automatic call distributor, a private branch exchange (PBX), or an IP-based software switch, wherein the switch-media gateway functions as a central switch within the contact center system and performs agent level routing of voice interactions within the contact center system;
 a call controller that includes computer-telephone integration software for interfacing with the switch/media gateway and that is connected to the switch/media gateway, that includes a session initiation protocol server for processing session initiation protocol communications, and that operates as an adapter between the switch/media gateway and a routing component of the contact center;
 a processor; and
 a memory, wherein the memory stores instructions that, when executed by the processor, cause the processor to perform a process that, when described in relation to how an exemplary first customer of the customers is positioned within the queue relative to other ones of the customers, includes the following steps:
  performing a first routine in relation to a previous voice interaction made by the first customer, wherein the previous voice interaction is made previous to the present voice interaction by the first customer, the previous voice interaction comprising the first customer being placed in the queue but ending before the first customer was connected to an agent as a result of a disconnection of the previous voice interaction between the first customer and the contact center system, the first routine comprising:
   receiving the previous voice interaction from the first customer utilizing a customer device via a network connected to the switch/media gateway of the contact center system;
   determining, via an automated process, a unique identifier in relation to the previous voice interaction, including extracting, with the call controller that is connected to the switch/media gateway of the contact center system, data regarding the previous voice interaction;
   tracking a previous queue time for the previous voice interaction, the previous queue time comprising a wait time that the first customer accrues during the previous voice interaction waiting to be connected to the agent by the switch/media gateway;
   detecting an end to the previous voice interaction occurring without the first customer being connected to an agent as a result of the disconnection of the previous voice interaction between the first customer and the contact center system;
   determining the previous queue time accrued by the first customer given the detected end;
   saving in a database a previous voice interaction record related to the previous voice interaction, wherein the previous voice interaction record includes the previous queue time associated with the unique identifier;
  performing a second routine in relation to the present voice interaction of the first customer, the second routine comprising:
   receiving the present voice interaction from the first customer utilizing the customer device via the network connected to the switch/media gateway of the contact center system;
   determining, via the automated process, a unique identifier in relation to the present voice interaction, including extracting, with the call controller that is connected to the switch/media gateway of the contact center system, data regarding the present voice interaction;
   tracking a present queue time in relation to the present voice interaction, the present queue time comprising a wait time that the first customer accrues during the present voice interaction waiting to be connected to the agent by the switch/media gateway;
   using the unique identifier of the present voice interaction to check the database to determine whether the previous voice interaction record stored therein has a unique identifier that matches the unique identifier of the present voice interaction and is therefore indicative of a prospective reconnection attempt between the first customer and the contact center system;
   in response to confirming that the unique identifier of the present voice interaction matches the unique identifier of the previous voice interaction record, retrieving the previous voice interaction record and determining therefrom the associated previous queue time;
   measuring a time lag that occurs between the previous voice interaction and the present voice interaction and determining whether the measured time lag is less than a maximum allowable time lag;
   conditionally calculating an adjusted total queue time for the first customer based on whether the measured time lag is less than a maximum allowable time lag such that: if the measured time lag is less than the maximum allowable time lag, the present voice interaction is determined to be indicative of a reconnection attempt between the first customer and the contact center system and the adjusted total queue time is calculated as a sum of the present queue time and the previous queue time; and if the measured time lag is greater than the maximum allowable time lag, the adjusted total queue time is calculated as being equal to the present queue time;
   positioning the first customer in the queue based on a descending order of a relative value of the calculated adjusted total queue time for the first customer versus the adjusted total queue times calculated for the other ones of the customers; and
   routing the present voice interaction of first customer to a user device of an agent of the contact center system using the switch/media gateway, and wherein the routing is ordered relative to routings of voice interactions of the other ones of the customers in accordance with the positioning of the first customer in the queue.

11. The contact center system of claim 10, wherein ordering the routings in accordance with the positioning of the first customer in the queue comprises completing the routing of the voice interaction of the first customer:

after each of the other ones of the customers positioned ahead of the first customer in the queue are connected to an agent; and before each of the other ones of the customers positioned behind of the first customer in the queue are connected to an agent.

12. The contact center system of claim 11, wherein the unique identifier for both the previous voice interaction and the present voice interaction comprises a phone number of a phone used to make each voice interaction.

13. The contact center system of claim 12, wherein both of the previous voice interaction and present voice interaction of the first customer are a telephone call made by a first phone of the first customer, the first phone having a first phone number;

wherein:
the step of determining the unique identifier for the previous voice interaction of the first customer comprises the contact center system determining, via the automated process as the previous voice interaction arrives at the contact center system, the first phone number of the first phone; and the step of determining the unique identifier for the present voice interaction of the first customer comprises the contact center system determining, via the automated process as the present voice interaction arrives at the contact center system, the first phone number of the first phone.

14. The contact center system of claim 11, wherein the previous voice interaction and the present voice interaction each comprises a voice interaction conducted via data network audio streaming initiated by the customer device of the first customer; and wherein:
the step of determining the unique identifier for the previous voice interaction of the first customer comprises the automated process based on data exchanged during the previous voice interaction between the customer device of the customer and the contact center system; and the step of determining the unique identifier for the present voice interaction of the first customer comprises the automated process based on data exchanged during the present voice interaction between the customer device of the customer and the contact center system; and the automated process includes at least one of a browser cookie and Internet Protocol (IP) address tracking.

* * * * *